United States Patent
Bade et al.

(10) Patent No.: US 10,664,323 B2
(45) Date of Patent: *May 26, 2020

(54) LIVE MIGRATION OF VIRTUAL MACHINES IN DISTRIBUTED COMPUTING SYSTEMS

(71) Applicant: Microsoft Technology Licensing, LLC, Redmond, WA (US)

(72) Inventors: Naresh Bade, Hyderabad (IN); Sangeeth Kumar, Hyderabad (IN); Mehul Vora, Hyderabad (IN); Amit Mittal, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 146 days.

This patent is subject to a terminal disclaimer.

(21) Appl. No.: 15/914,204

(22) Filed: Mar. 7, 2018

(65) Prior Publication Data
US 2019/0278624 A1    Sep. 12, 2019

(51) Int. Cl.
*G06F 9/50* (2006.01)
*G06F 9/48* (2006.01)
(Continued)

(52) U.S. Cl.
CPC .......... *G06F 9/5088* (2013.01); *G06F 3/0604* (2013.01); *G06F 3/064* (2013.01); *G06F 3/067* (2013.01); *G06F 3/0647* (2013.01); *G06F 3/0659* (2013.01); *G06F 3/0664* (2013.01); *G06F 9/455* (2013.01); *G06F 9/45533* (2013.01); *G06F 9/45558* (2013.01); *G06F 9/46* (2013.01); *G06F 9/461* (2013.01);
(Continued)

(58) Field of Classification Search
CPC combination set(s) only.
See application file for complete search history.

(56) References Cited

U.S. PATENT DOCUMENTS 8,490,092 B2 * 7/2013 Reuther ................ G06F 3/0647
718/1
8,656,018 B1 2/2014 Keagy et al.
(Continued)

OTHER PUBLICATIONS

"International Search Report and Written Opinion Issued in PCT Application No. PCT/US2019/012004", dated Mar. 25, 2019, 12 Pages.
(Continued)

*Primary Examiner* — Charles M Swift
(74) *Attorney, Agent, or Firm* — Liang IP, PLLC

(57) ABSTRACT

A virtual disk and associated methods for facilitating live migration of virtual machines in distributed computing systems are disclosed herein. In one embodiment, a method includes during a live migration of a virtual machine, determining whether a destination virtual disk on a node contains a block of data corresponding to the migrated virtual machine. The method can also include, in response to determining that the destination virtual disk does not contain the block of data, retrieving the block of data from a source virtual disk of the migrated virtual machine, writing the retrieved block of data to one or more empty sectors on the destination virtual disk, and marking the one or more written to sectors containing the block of data as read-only on the destination virtual disk.

18 Claims, 13 Drawing Sheets

(51) Int. Cl.
*G06F 9/455* (2018.01)
*G06F 9/46* (2006.01)
*G06F 3/06* (2006.01)

(52) U.S. Cl.
CPC ........... *G06F 9/48* (2013.01); *G06F 9/485* (2013.01); *G06F 9/4806* (2013.01); *G06F 9/4843* (2013.01); *G06F 9/4856* (2013.01); *G06F 9/4868* (2013.01); *G06F 9/4875* (2013.01); *G06F 9/50* (2013.01); *G06F 9/5005* (2013.01); *G06F 9/5011* (2013.01); *G06F 9/5016* (2013.01); *G06F 9/5027* (2013.01); *G06F 9/5083* (2013.01); *G06F 2009/4557* (2013.01); *G06F 2009/45562* (2013.01); *G06F 2009/45575* (2013.01); *G06F 2009/45583* (2013.01); *G06F 2009/45595* (2013.01)

(56) References Cited

U.S. PATENT DOCUMENTS

| | | | |
|---|---|---|---|
| 9,529,636 | B2 | 12/2016 | Oshins |
| 9,535,767 | B2 | 1/2017 | Oshins |
| 9,733,860 | B2* | 8/2017 | Reuther ............... G06F 3/0647 |
| 9,921,866 | B2 | 3/2018 | Ganguli et al. |
| 2009/0154709 | A1* | 6/2009 | Ellison ................. H04L 9/083 380/282 |
| 2009/0216975 | A1 | 8/2009 | Halperin et al. |
| 2010/0107163 | A1 | 4/2010 | Lee |
| 2010/0250868 | A1 | 9/2010 | Oshins |
| 2010/0251234 | A1 | 9/2010 | Oshins |
| 2011/0320556 | A1 | 12/2011 | Reuther |
| 2012/0185856 | A1* | 7/2012 | Ashihara ............... G06F 9/4856 718/1 |
| 2013/0041977 | A1* | 2/2013 | Wakamiya ........... G06F 9/5077 709/217 |
| 2014/0317394 | A1 | 10/2014 | Buhler et al. |
| 2014/0359213 | A1 | 12/2014 | Messec et al. |
| 2015/0058520 | A1 | 2/2015 | Armstrong et al. |
| 2015/0378766 | A1 | 12/2015 | Beveridge et al. |
| 2016/0150421 | A1 | 5/2016 | Li et al. |
| 2016/0350010 | A1* | 12/2016 | Ryan .................... G06F 3/0619 |
| 2017/0068562 | A1 | 3/2017 | Oshins |
| 2017/0075617 | A1 | 3/2017 | Oshins |
| 2019/0213025 | A1 | 7/2019 | Bade et al. |
| 2019/0370052 | A1 | 12/2019 | Bade et al. |

OTHER PUBLICATIONS

Zhang, et al., "VMThunder: Fast Provisioning of Large-Scale Virtual Machine Clusters", In Proceedings of the IEEE Transactions on Parallel and Distributed Systems, vol. 25, Issue 12, Dec. 1, 2014, pp. 3328-3338.

"Notice of Allowance Issued in U.S. Appl. No. 15/866,017", dated Jun. 12, 2019, 9 Pages.

"International Search Report and Written Opinion Issued in PCT Application No. PCT/US2014/066992", dated Apr. 30, 2019, 13 Pages.

"Hyper-V", Retrieved From <<https://docs.microsoft.com/en-us/previous-versions/windows/it-pro/windows-server-2012-R2-and-2012/mt169373(v=ws.11)>>, Oct. 25, 2016, 5 Pages.

\* cited by examiner

LIVE MIGRATION OF VIRTUAL MACHINES IN DISTRIBUTED COMPUTING SYSTEMS

BACKGROUND

Cloud computing allows multiple users to access and share pools of configurable computing resources over a computer network. Such shared computing resources can be located in one or more datacenters or other suitable distributed computing systems. In such systems, routers, switches, bridges, load balancers, or other network devices interconnect a large number of servers, network storage devices, and other computing devices. Individual servers can host one or more virtual machines, virtual switches, or other types of virtualized functions configured to provide computation, communications, storage, or other suitable types of computing services to users. The provided computing services are commonly referred to as "cloud computing services" or "cloud services."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In computing, a virtual machine generally refers to an emulation of a physical computing system. Virtual machines can be based on certain computer architectures (e.g., x86) and provide functionality of a physical computer. In some distributed computing systems, instantiation of a virtual machine involves allocating compute (e.g., servers or processors), network storage (e.g., persistent data storage), and other suitable types of computing resources to the virtual machine. Instantiation can also involve obtaining digital files or "images" of operating systems, system and/or user applications, and other suitable data from an image store in the distributed computing systems. The one or more allocated servers can then access and execute instructions of the obtained images to provide a suitable computing environment for the virtual machine.

In certain computing systems, allocated network storage to a virtual machine can be surfaced to the virtual machine as a "virtual disk" or "virtual drive." Virtual disks and virtual drives are software components that emulate or "virtualize" one or more actual disk storage devices such as an optical disc drive, a floppy disk drive, or a hard disk drive. In one implementation, a virtual disk can be implemented as a base disk configured to contain a parent image that is read-only and one or more differencing disks configured to contain a set of modified data blocks (maintained in a separate file referred to as the "child image") in relation to the parent image. The differencing disks can allow operations to undo changes. For example, when enabled, all changes to a parent image are stored in one or more child images. Thus, options are available to undo one or more changes to the parent image, or to merge the parent and child images permanently.

During operation, an instantiated virtual machine may need to be moved or "migrated" from one hosting node (e.g., a physical server) to another due to workload balancing, server hardware/software failure, system maintenance, or other suitable reasons. One migration technique, referred to herein as "live migration," involves moving a running virtual machine between different physical hosts without disconnecting a client (e.g., a user or another application) from the migrated virtual machine. During a live migration, memory, storage, and network connectivity of the virtual machine are transferred from the source node to the destination node.

Pre-copy and post-copy migrations are two techniques for live migrating virtual machines. According to pre-copy migration, data of a migrated virtual machine are copied from a source node to a destination node while the virtual machine is still running on the source node. Upon completion of copying the data, the virtual machine is started on the destination node. However, during this copying process, if some data are changed (i.e., become "dirty") due to application processing at the virtual machine or other reasons, the dirty data are re-copied from the source node to the destination node. Such re-copying can present difficulties when the virtual machine on the source node is running high performance computing workloads ("HCP", e.g., computational chemistry workloads) because a rate at which the virtual machine at the source node generates dirty data can outpace a rate of copying the data from the source node to the destination node. As such, an amount of data needed to be copied from the source node to the destination node may not reduce or even increase over many iterations. Hence, the data corresponding to the migrated virtual machine on the host and destination nodes would not converge.

Post-copy migration can be more suitable than pre-copy migration for migrating virtual machines running such HPC workloads. Post-copy migration is initiated by suspending the virtual machine at the source node. With the virtual machine suspended at the source node, a minimal subset of execution state of the virtual machine (e.g., CPU state, registers, non-pageable memory, etc.) can be transferred to the destination node. The virtual machine is then resumed at the destination node with the subset of execution state received from the source node. Subsequently, the source node can actively push remaining blocks of data of the migrated virtual machine to the destination node in a process referred to as pre-paging.

Pre-paging, however, can degrade performance of applications running in the virtual machine on the destination node when the virtual machine attempts to access many blocks of data that have not yet been transferred. Instead, the source node may push other blocks of data that the virtual machine currently does not need via pre-paging. Several embodiments of the disclosed technology can address certain aspects of the foregoing difficulties by implementing a base caching disk at the destination node to streamline transfer of the blocks of data of the migrated virtual machine from the source node to the destination node during a post-copy migration. In particular, the base caching disk can be configured to perform on-demand fetching of one or more blocks of data from the source node as needed in lieu of or in addition to pre-paging. In certain embodiments, a base caching disk can be implemented as a virtual disk that can be written to only once for each data sector. After a first write, the written to sector of the base caching disk becomes read-only.

In certain implementations, before the migrated virtual machine is started on the destination node, a base caching disk ("destination disk") can be created which parents to blocks of data of the virtual machine on a virtual disk ("source disk") at the source node. A differencing disk can also be created which parents to the base caching disk to isolate writes by the virtual machine on the destination node. In operation, for all reads that are not served from the differencing disk or the destination disk, the requested data can be served from the source disk. The requested data can then be saved in the destination disk, and the corresponding sectors can be marked as read only.

As the post-copy migration progresses, additional blocks of data of the migrated virtual machine can be retrieved and written to sectors of the destination disk in response to virtual machine requests and/or via background processing at the destination node. Eventually, the destination disk would contain an entire copy of the blocks of data of the virtual machine from the source node. Upon completion of transferring the entire copy of the blocks of data to the destination disk at the destination node, the source disk can be removed as a parent of the destination disk. Optionally, the differencing disk and the destination disk can also be merged into a dynamic virtual disk at the destination node after a certain period of time or according to other suitable criteria.

Several embodiments of the disclosed technology can thus improve efficiencies of post-copy migration by streamlining the transfer of blocks of data of the migrated virtual machine from the source node to the destination node. Instead of or in addition to pre-paging, blocks of data of the migrated virtual machine can be fetched in an on-demand fashion. For example, when the migrated virtual machine on the destination node requests one or more blocks of data for processing, the requested blocks of data can be transferred from the source disk to the destination disk. As such, efficiencies of life migration of virtual machines can be improved.

DETAILED DESCRIPTION

Figure 1:
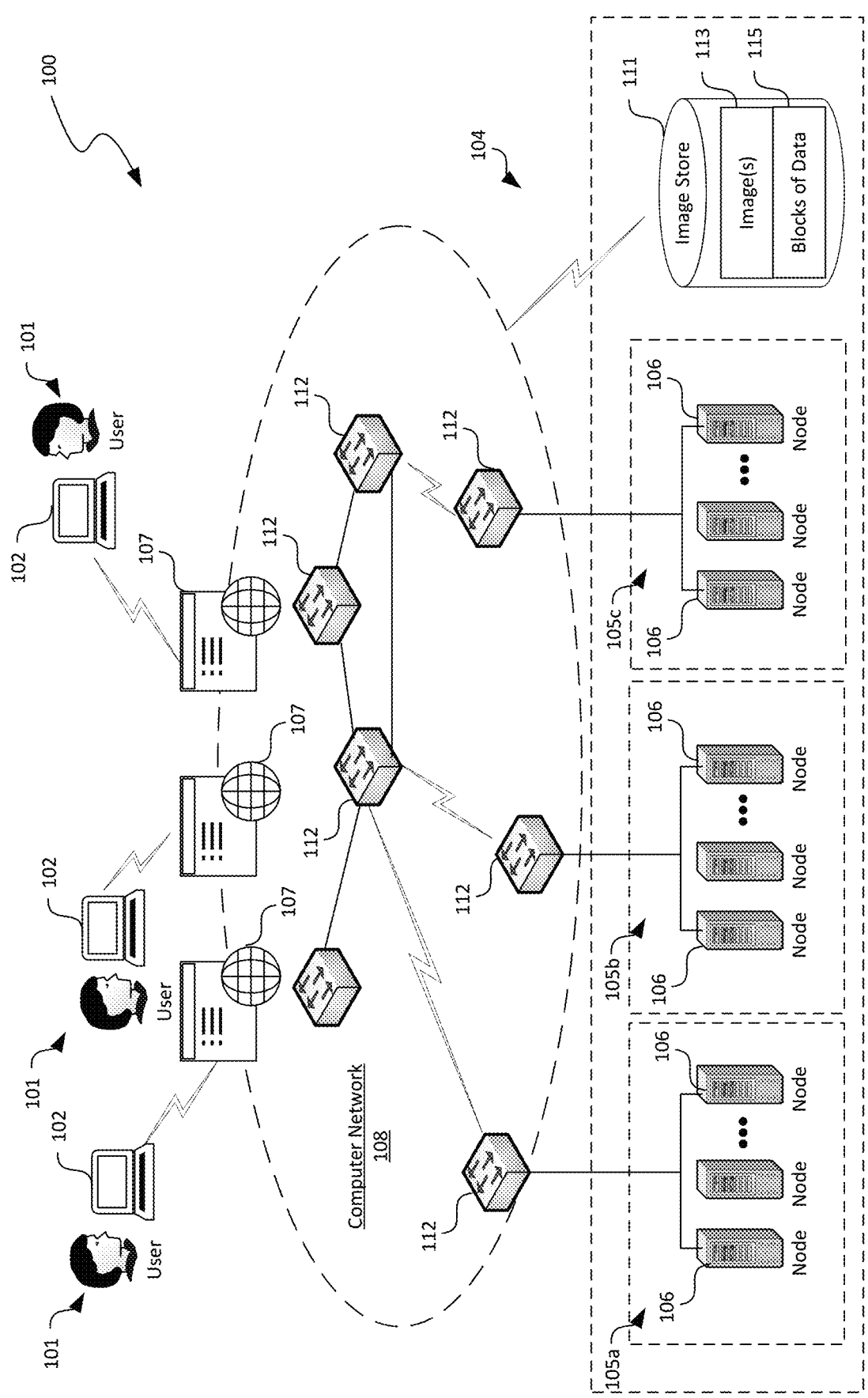
FIG. 1 is a schematic diagram of a distributed computing system configured for fast instantiation of virtual machines in accordance with embodiments of the disclosed technology.

Certain embodiments of computing systems, devices, components, modules, routines, and processes for efficient live migration of virtual machines in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-7.

As used herein, the term "computing cluster" generally refers to a computing system having a plurality of network devices that interconnect multiple servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric," which forms at least a part of a distributed computing system. The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. In one example, a node can include a computing server having a hypervisor configured to support one or more virtual machines.

As used herein, the term "instantiation" generally refers to generating an instance or occurrence of a computing object that exists during runtime of a computer program. Instantiation binds logical requirements for resources such as memory, processor, and networking access used by, for example, a virtual machine to concrete instances of appropriate resources in a distributed computing system. For example, instantiation of a virtual machine includes, inter alia, allocating appropriate compute, storage, network, and other suitable resources from a pool of resources in a distributed computing system, obtaining images of operating systems, user applications, or other suitable types of data, and executing suitable instructions contained in the obtained images to generate a computing environment that emulates a physical computer.

Also used herein, the term "migration" of virtual machines generally refers to a process of moving a virtual machine from one node or storage location to another. "Live migration" of virtual machines generally refers to moving a running virtual machine between different physical nodes without disconnecting a client (e.g., a user or another application) from the migrated virtual machine. The term "pre-copy migration" generally refers to a process in which all blocks of data of a migrated virtual machine is copied from a source node to a destination node while the virtual machine is still running on the source node. Upon completion of such copying, the virtual machine on the destination node is started. In contrast, the term "post-copy migration" generally refers to starting the migrated virtual machine on the destination node before copying at least a part of the blocks of data of the virtual machine from the source node.

Further used herein, the term "cloud service" generally refers to one or more computing resources provided over a computer network, such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, the phrase "central image store" or "image store" generally refers to a network storage space containing files or file images that are accessible by various nodes of a distributed computing system. In certain implementations, a central image store can include a network accessible database hosted on one or more nodes in a distributed computing system. Entries of the database can contain various suitable types of files or file images. Also used herein, a "file," "file image," or "image" generally refers to a collection of digital data that can be stored in a tangible computer storage device or medium. For example, a file image can include a complete copy of an operating system, user applications, application data, user data, or other suitable types of data for a virtual machine. A file image can be logically divided into blocks, sections, pages, blobs, or other suitable logical subdivisions of data. For example, a file image of data associated with a virtual machine can be logically divided into blocks of 256 Kilobytes, 512 Kilobytes, or other suitable sizes. Each block of data may be recorded, written, or stored in one or more sectors, partitions, or other suitable divisions of a computer storage device.

Further used herein, a "virtual disk" or "virtual drive" generally refers to one or more software components that emulate an actual and physical disk storage device, such as an optical disc drive, a floppy disk drive, or a hard disk drive. To other programs, a virtual disk behaves like an actual physical device. A virtual disk can be implemented as a disk image that contains data structures of an actual storage device. In accordance with embodiments of the disclosed technology, a virtual disk can include one or more differencing disks coupled to a base caching disk that is a parent to the one or more differencing disks. A "differencing disk" is a virtual disk that contains blocks of data that represent changes to a parent virtual disk, such as a base caching disk. A "base caching disk" or "BCD" is a virtual disk whose sectors can be written only once. Upon completion of a first write to a sector, the sector of the base caching disk is marked as read-only. In contrast, a "base disk" is a virtual disk that is read-only and cannot be written to at all.

In certain computing systems, post-copy migration can be implemented via pre-paging after starting the migrated virtual machine on a destination node. Pre-paging, however, can degrade performance of applications running in the virtual machine on the destination node when the started virtual machine attempts to access blocks of data that have not yet been transferred. In addition, data of the migrated virtual machine can reside on both the source and destination nodes once the virtual machine is started on the destination node and application execution is resumed. As such, if the migrated virtual machine fails on the destination node, recovery of the migrated virtual machine may not be possible.

Several embodiments of the disclosed technology can streamline transfer of the blocks of data of a migrated virtual machine from the source node to the destination node during a post-copy migration by implementing a base caching disk at the destination node. In certain implementations, before the migrated virtual machine is started on the destination node, a base caching disk ("destination disk") can be created which parents to a virtual disk ("source disk") of the virtual machine on the source node. A differencing disk can also be created which parents to the base caching disk to isolate writes by the virtual machine on the destination node. In operation, for all reads that are not present or served from the differencing disk or the destination disk, the requested data can be served from the source disk. The requested data can then be saved in the destination disk, and the corresponding sectors can be marked as read only. Once transfer is completed, the destination disk can include a complete read-only copy of the blocks of data from the source node. As such, efficiencies of the post-copy live migration of the virtual machine can be improved, as described in more detail below with reference to FIGS. 1-7.

FIG. 1 is a schematic diagram of a distributed computing system 100 configured for efficient live migration of virtual machines in accordance with embodiments of the disclosed technology. As shown in FIG. 1, the distributed computing system 100 can include a computer network 108 interconnecting a plurality of users 101 via client devices 102 and a computing fabric 104. Even though particular components of the distributed computing system 100 are shown in FIG. 1, in other embodiments, the distributed computing system 100 can also include additional and/or different constituents. For example, the distributed computing system 100 can include additional computing fabrics, network storage devices, utility infrastructures, and/or other suitable components.

The client devices 102 can each include a computing device that facilitates corresponding users 101 to access cloud services provided by the computing fabric 104 via the computer network 108. For example, in the illustrated embodiment, the client devices 102 individually include a desktop computer. In other embodiments, the client devices 102 can also include laptop computers, tablet computers, smartphones, or other suitable computing devices. Even though three users 101 and corresponding client devices 102 are shown in FIG. 1 for illustration purposes, in other embodiments, the distributed computing system 100 can facilitate any suitable number of users 101 to access computing services provided by the computing fabric 104.

As shown in FIG. 1, the computer network 108 can include one or more network devices 112 that interconnect the users 101 and components of the computing fabric 104. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies. In one embodiment, the computer network 108 includes the Internet. In other embodiments, the computer network 108 can also include a local area network, a wide area network, a virtual private network, or other suitable types of computer network.

Also shown in FIG. 1, the computing fabric 104 can include an image store 111 and a plurality of nodes 106 operatively coupled to one another by the network devices 112. In certain embodiments, the nodes 106 can individually include a processor, a physical server, or a blade containing several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three computing clusters 105 (shown individually as first, second, and third computing clusters 105a-105c, respectively), which are operatively coupled to corresponding network devices 112 in the computer network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

Figure 2A:
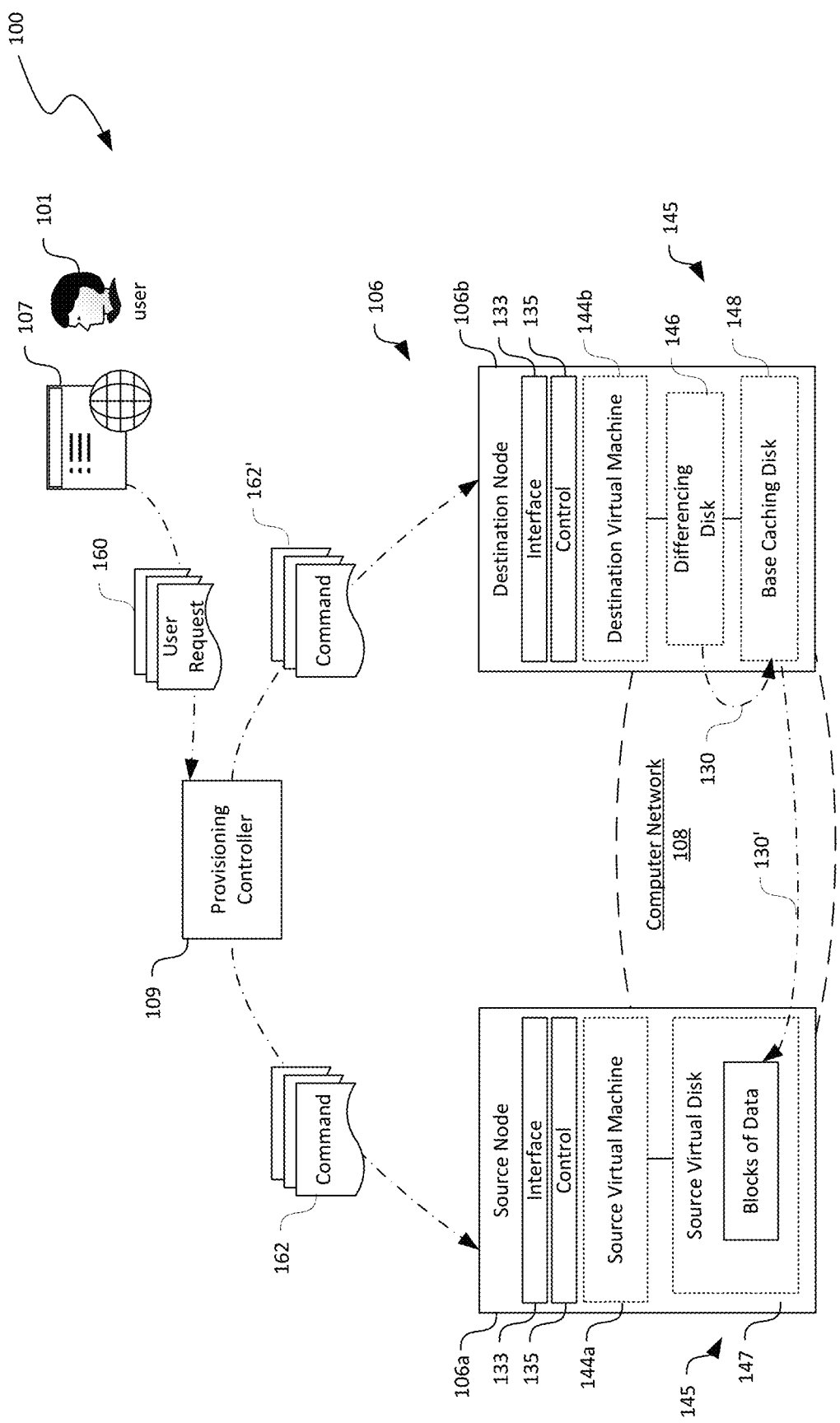
FIGS. 2A and 2B are schematic diagrams illustrating hardware/software components of the distributed computing system in FIG. 1 in which a base caching disk is utilized for facilitating live migration of virtual machines in accordance with embodiments of the disclosed technology.
Figure 2B:
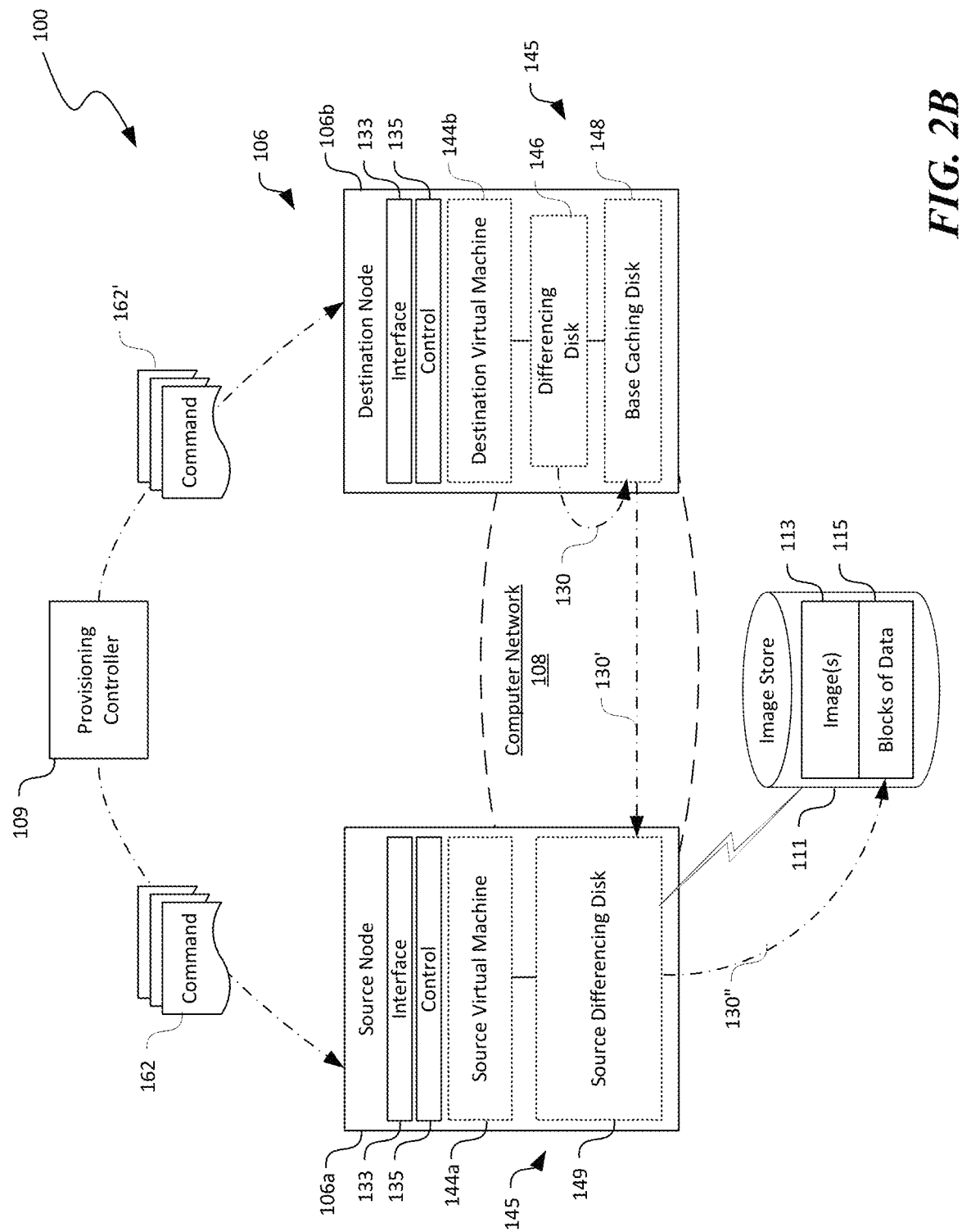

The image store 111 can be configured to contain copies of files and/or disk images 113 suitable for instantiating one or more virtual machines or "VM" 144 (shown in FIGS. 2A and 2B). For example, the individual image 113 can include a complete copy of an operating system, such as Windows® or Linux®. In another example, the image 113 can also include one or more user applications, resource files, or other suitable types of data suitable for instantiating a virtual machine 144. As shown in FIG. 1, in further embodiments, the image store 111 can also include at least a partial copy of blocks of data corresponding to one or more virtual machines 144 or applications executing on one or more of the nodes 106. Even though the image store 111 is shown in FIG. 1 as a single database, in other embodiments, the image store 111 can also be implemented as a distributed database hosted on multiple nodes 106.

In operation, the users 101 can request the computing fabric 104 to instantiate one or more virtual machines 144 by, for example, submitting requests via user portals 107 using the client devices 102. In response, the computing fabric 104 can authenticate the user requests and upon authentication, allocating suitable computation (e.g., one or more nodes 106), storage, network, or other suitable types of computing resources. The computing fabric 104, via, for example, a fabric controller (not shown) can then instruct the allocated nodes 106 to instantiate the requested virtual machines 144. As discussed in more detail below with reference to FIGS. 2A-2B, the nodes 106 can be configured to implement one or more base caching disks 148 (shown in FIGS. 2A and 2B) for facilitating efficient post-copy live migration of a virtual machine 144 between a pair of the nodes 106.

FIGS. 2A and 2B are schematic diagrams illustrating certain hardware/software components of the distributed computing system 100 in FIG. 1 in accordance with embodiments of the disclosed technology. In FIGS. 2A and 2B, certain components of the distributed computing system 100 are omitted for clarity. For example, only two nodes 106, i.e., a source node 106a and a destination node 106b, are shown in FIGS. 2A and 2B for illustration purposes. In other embodiments, distributed computing system 100 can include any suitable numbers of nodes 106 and/or computing clusters 105.

In addition, in FIGS. 2A and 2B and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form.

Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, a user 101 can access the user portal 107 provided by a corresponding client device 102 for transmitting a user request 160 requesting a virtual machine 144 be instantiated in the distributed computing system 100. The user request 160 can include a name, a template, a list of one or more specified features, a location, or other suitable information related to the virtual machine 144. In other embodiments, the user 101 can also provide display configurations, credentials, execution configurations, subscription information, or other suitable data via the user portal 107. In further embodiments, a developer, administrator, or other suitable types of entity can provide the configurations, and/or other suitable information in lieu of or in addition to the user 101.

Also shown in FIG. 2A, a provisioning controller 109 (e.g., a fabric controller or a component thereof) can be configured to receive the user request 160, identify the user request 160 as a request for a virtual machine 144 based on information included in the user request 160 and allocate, for example, the source node 106a for instantiating the requested virtual machine 144 (shown in FIG. 2A as "source virtual machine 144a"). Subsequently, the provisioning controller 109 or other suitable components of the distributed computing system 100 can instruct the allocated source node 106a for initialize an instantiation process for providing the requested source virtual machine 144a. In response, the source node 106a can instantiate the source virtual machine 144a for use by the user 101.

Subsequently, the provisioning controller 109 or other suitable components in the distributed computing system 100 can be configured to determine that the source virtual machine 144a is to be migrated to the destination node 106b due to workload balancing, server hardware/software failure, system maintenance, or other suitable reasons. In response, the provisioning controller 109 can issue commands 162 and 162' to both the source node 106a and the destination node 106b to initiate a post-copy live migration of the source virtual machine 144a from the source node 106a to the destination node 106b. In response, the source node 106a can suspend the source virtual machine 144a and transfer a minimal subset of execution state of the source virtual machine 144a (e.g., CPU state, registers, non-pageable memory, etc.) to the destination node 106b. The destination node 106b can then instantiate a destination virtual machine 144b with the subset of execution state received from the source node 106a. Once started, the destination virtual machine 144b can resume execution of one or more applications (not shown) for the user 101 before a complete copy of blocks of data of the source virtual machine 144a is transferred to the destination node 106b. Components of the source and destination nodes 106a and 106b configured to facilitate an efficient post-copy live migration of the virtual machine 144 are described in more detail below.

As shown in FIG. 2A, the source node 106a and the destination node 106b can each include an interface component 133 and a control component 135 for managing operations of virtual disks on the source and destination nodes 106a and 106b. The interface component 133 can be configured to receive the commands 162 and 162', analyze content of the commands 162 and 162', and forward results of analysis to the control component 135. For example, the interface component 133 can indicate to the control component 135 a type (e.g., differencing, base, base caching, etc.), size (e.g., fixed or dynamic), or other suitable information related to virtual disks 145 associated with the source and destination virtual machines 144a and 144b. In turn, the control component 135 can configure and facilitate operations of the virtual disks 145, such as those described below with reference to FIGS. 3A-4C, as indicated by the interface component 133. In the illustrated example, one virtual machines 144 with corresponding virtual disk 145 is shown on a single node 106 for illustration purposes. In other examples, each node 106 can support one, three, four, or any suitable number of virtual machines 144 with corresponding virtual disks 145.

As shown in FIG. 2A, the source virtual machine 144a can be associated with a source virtual disk 147. In certain embodiments, the source virtual disk 147 can include a base disk with one or more differencing disks (not shown). In other embodiments, the source virtual disk 147 can include one or more other suitable types of virtual disks with a fixed or dynamic size. As shown in FIG. 2A, the source virtual disk 147 can contain blocks of data 115 (shown in FIG. 3A) representing the blocks of data and other suitable types of data corresponding to the source virtual machine 144a. In other embodiments, at least a part of the blocks of data 115 may be stored in, for example, the central image store 111 (FIG. 1) as shown in FIG. 2B, or other suitable locations in the distributed computing system 100.

Also shown in FIG. 2A, the destination virtual machine 144b can be associated with a virtual disk 145 that includes a differencing disk 146 coupled to a base caching disk 148. The base caching disk 148 is thus a parent to the differencing disk 146, as indicated by the arrow 130. In accordance with embodiments of the disclosed technology, the control component 135 can also configured the blocks of data 115 in the source virtual disk 147 as a parent of the base caching disk 148, as indicated by the arrow 130'. As such, any blocks of data 115 contained in the source virtual disk 147 can act as a base disk for the base caching disk 148 on the destination node 106b. The base caching disk 148 can be configured to retrieve blocks of data 115 of the virtual machine 144a from the source virtual disk 147 in an on-demand fashion, and thus streamline the post-copy live migration process. Details of operations of the source virtual disk 147, the base caching disk 148, and the differencing disk 146 are described in more detail below with reference to FIGS. 3A-3G.

Even though FIG. 2A illustrates that the source virtual machine 144a as containing a complete copy of the blocks of data 115 of the source virtual machine 144a on the source node 106a, in other embodiments, at least a part of the blocks of data 115 can be located, for example, at the image store 111, as shown in FIG. 2B. The virtual disk 145 on the source node 106a can be implemented as a source differencing disk 149 that is a child to the blocks of data 115 in the image store 111. As such, the blocks of data 115 is a parent to the source differencing disk 149, as indicated by the arrow 130", while the source differencing disk 149 is a parent to the base caching disk 148 on the destination node 106b, as indicated by the arrow 130'. Details of operations of the source differencing disk 149 and the base caching disks 148 are described in more detail below with reference to FIGS. 4A-4C.

Figure 3A:
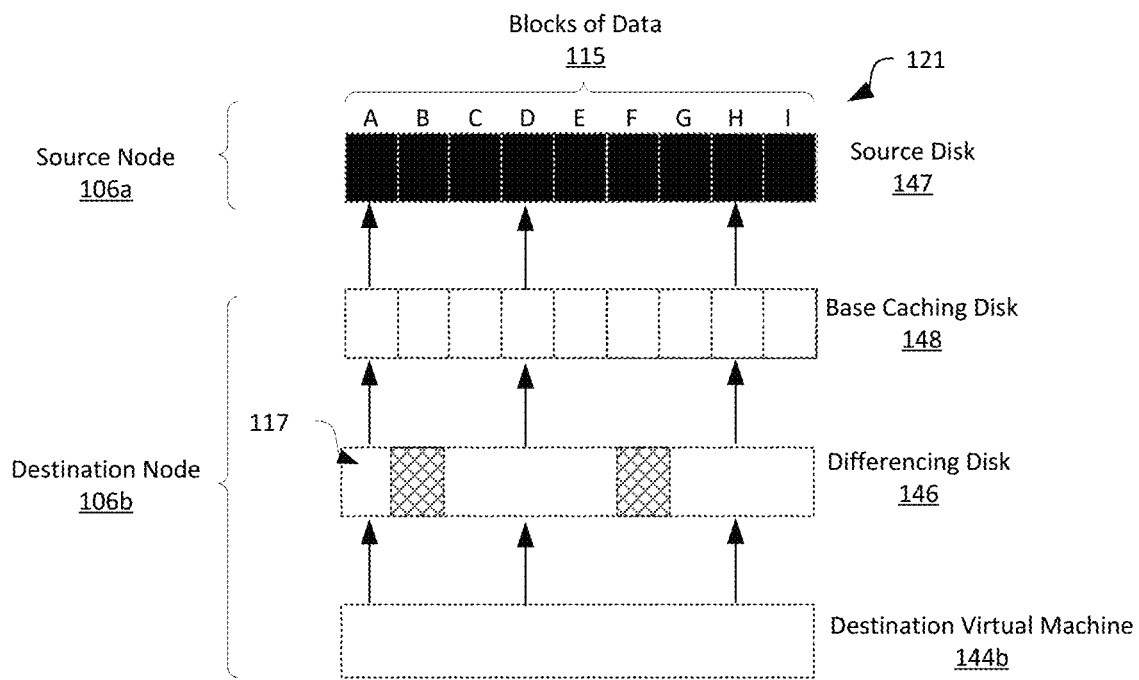
FIGS. 3A-3G are schematic diagrams illustrating various operation stages of utilizing a base caching disk for facilitating live migration of virtual machines in accordance with embodiments of the disclosed technology.

FIGS. 3A-3G are schematic diagrams illustrating various operation stages of utilizing a base caching disk 148 for facilitating post-copy live migration of a source virtual machines 144a (FIG. 2A) from the source node 106a to the destination node 106b in a distributed computing system 100 shown in FIG. 2A in accordance with embodiments of the disclosed technology. As shown in FIG. 3A, the source disk 147 of the source node 106a can include a copy of the blocks of data 115 of the source virtual machine 144a. In the illustrated example, nine blocks of data 115, identified as block A-I, are shown for illustration purposes. In other embodiments, the blocks of data 115 can include any suitable number of blocks or can be divided into data blocks or other suitable divisions.

Also shown in FIG. 3A, the base caching disk 148 can be initially empty because the blocks of data 115 has not been copied from the source node 106a even though the destination virtual machine 144b has been instantiated and started. However, the differencing disk 146 on the destination node 106b may contain certain blocks of data 117 unique to the destination virtual machine 144b, for example, written to the differencing disk 146 by the destination virtual machine 144b after initiation. Such blocks of data 117 can represent a difference between corresponding data on the base caching disk 148 and destination virtual machine 144b.

As shown in FIG. 3A, during an initial operation, the destination virtual machine 144b on the destination node 106b can determine that certain blocks of data 115 are now needed for executing instructions for an application (not shown) or other suitable software components executing in the destination virtual machine 144b. In the illustrated example, blocks A, D, and H are indicated as needed. As such, the destination virtual machine 144b requests the control component 135 (FIG. 2A) to provide data from blocks A, D, and H. The control component 135 can then determine whether the differencing disk 146 contains such data. In response to determining that the differencing disk 146 does not contain such data, the control component 135 can determine whether the base caching disk 148 on the destination node 106b contains such data. As shown in FIG. 3A, the base caching disk 148 also does not contain the requested data. In response, the control component 135 can access the parent of the base caching disk 148, i.e., the blocks of data 115 on the source disk 147 for retrieving blocks A, D, and H without downloading the entire blocks of data 115.

Figure 3B:
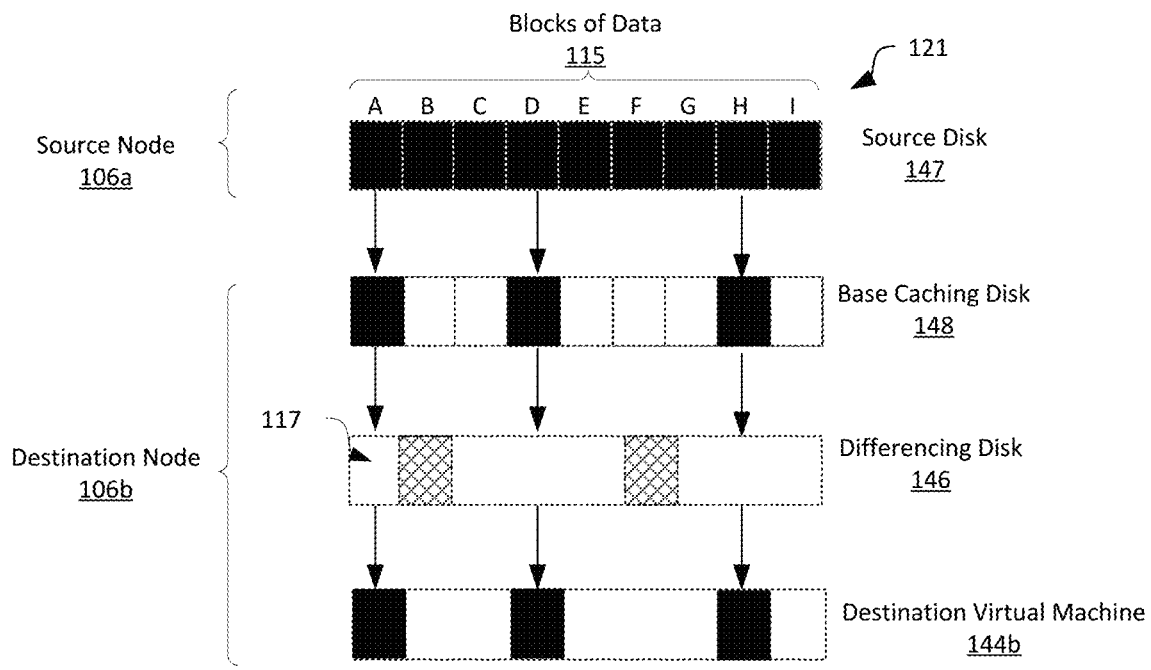
Figure 3C:
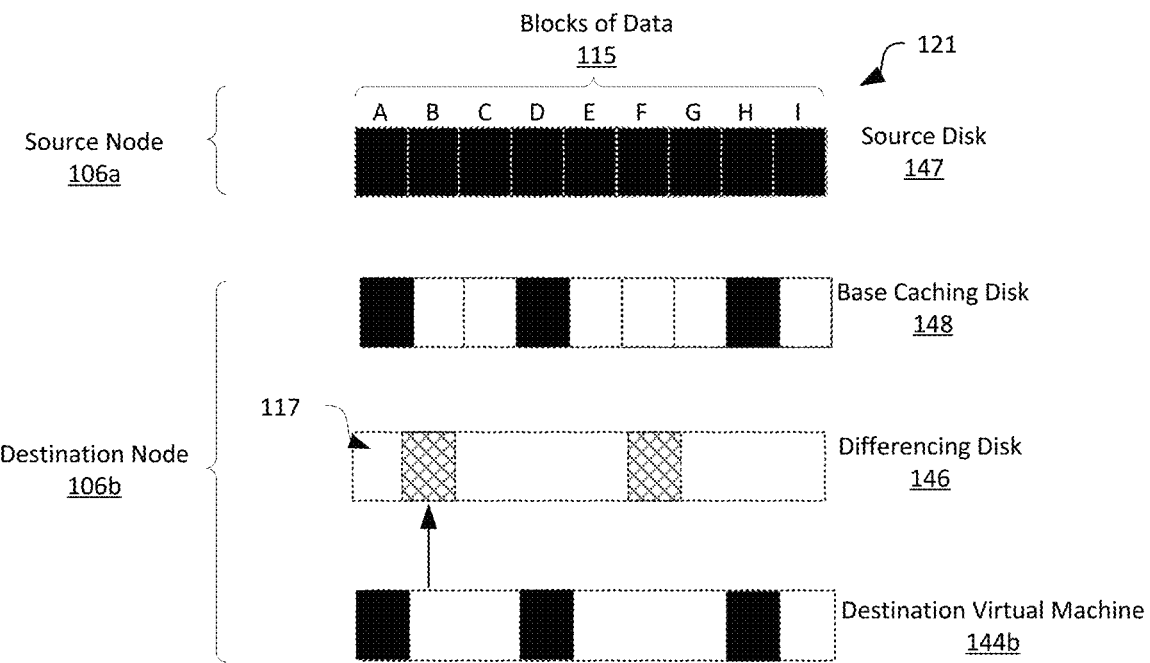
Figure 3D:
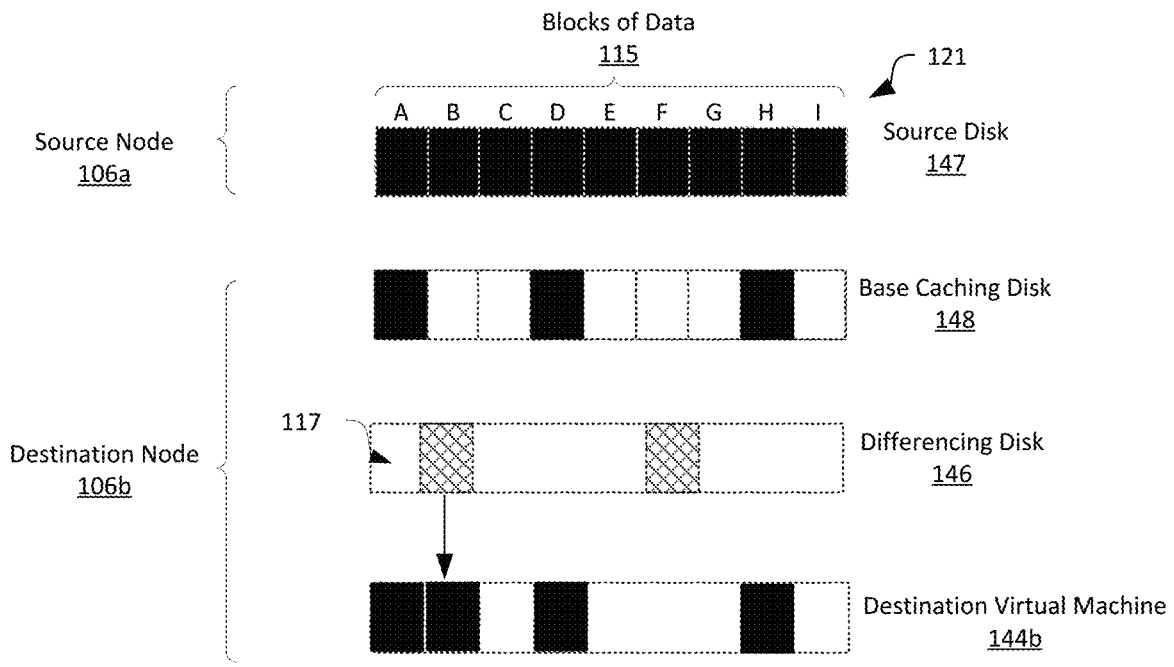

As shown in FIG. 3B, once received the data from blocks A, D, and H, the control component 135 can cause the received data to be written into corresponding sectors in the base caching disk 148 and upon completion of the writes, mark the sectors corresponding to blocks A, D, and H as read-only. The control component 135 can then provide a copy of the received data from the base caching disk 148 to the destination virtual machine 144b via the differencing disk 146. Subsequently, the destination virtual machine 144b can determine that data from block B is now needed for execution. As shown in FIG. 3C, the control component 135 can determine whether the differencing disk 146 contains such data. As shown in FIG. 3D, in response to determining that the differencing disk 146 contains such data, the control component 135 provides the data of block B from the differencing disk 146 to the destination virtual machine 144b.

Figure 3E:
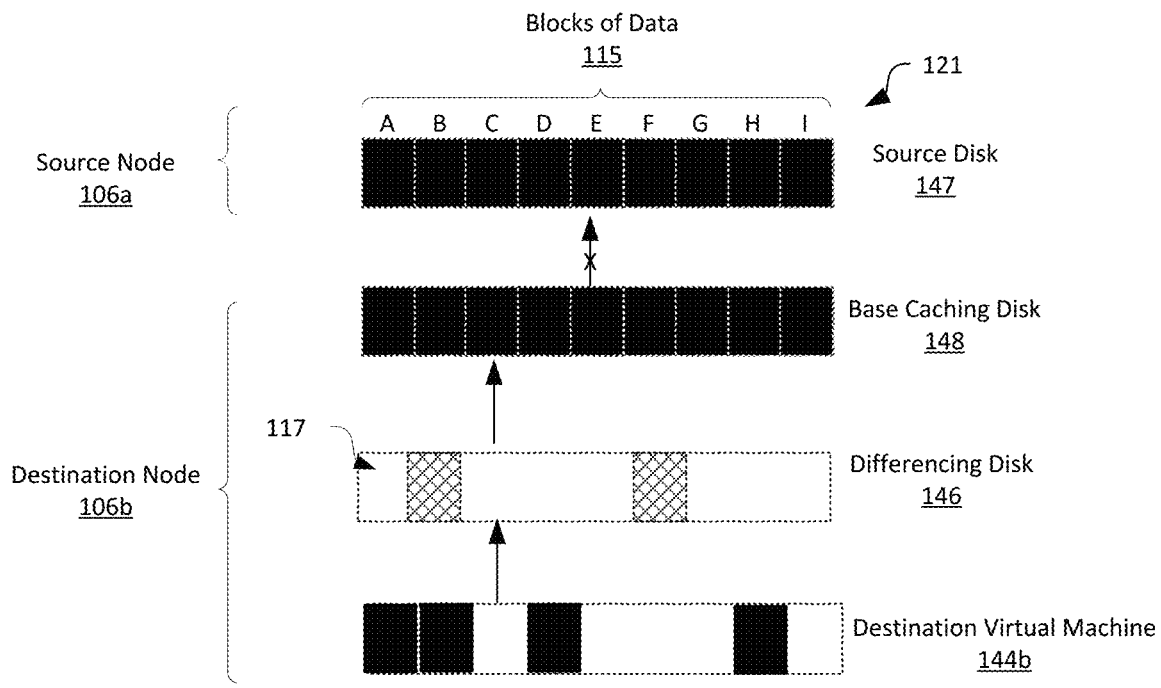
Figure 3F:
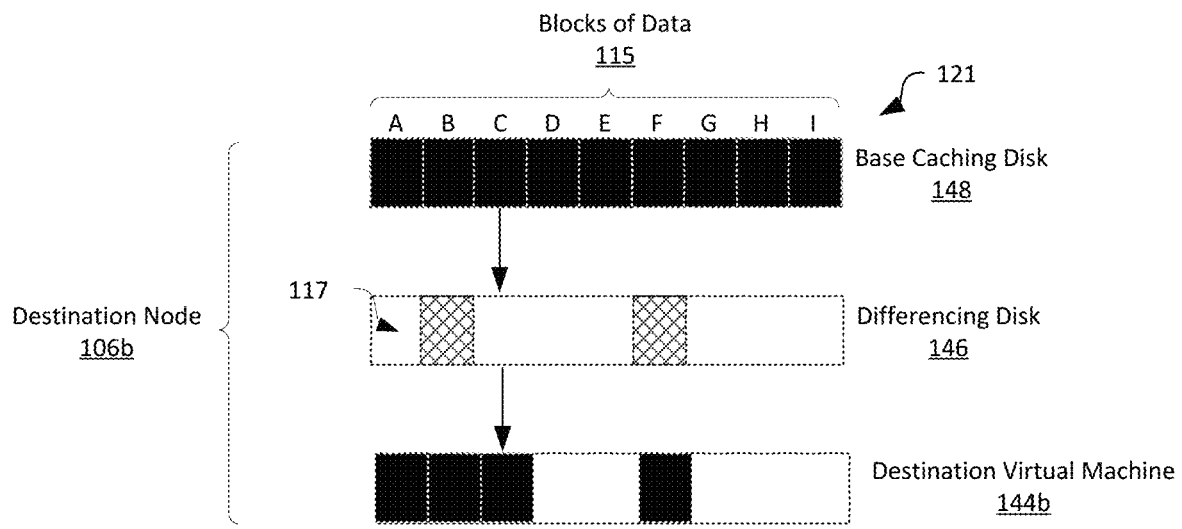

As the destination virtual machine 144b requests more and more additional data from blocks of data 115 of the virtual machine 144a, or via background processing at the destination node 106b, the remaining blocks of data 115 can be written into corresponding sectors of the base caching disk 148 and be marked as read-only. As shown in FIG. 3E, in certain embodiments, once a complete copy of the blocks of data 115 has been written into the base caching disk 148, the control component 135 can remove the blocks of data 115 at the source disk 147 as a parent for the base caching disk 148. Subsequent requests for blocks of data 115, for example, for the destination virtual machine 144b can be served from the base caching disk 148 without accessing the source disk 147, as shown in FIG. 3F. As such, a complete copy of the blocks of data 115 of the source virtual machine 144a can be maintained on the destination node 106b during the live migration of the source virtual machine 144a. At the same time, changes to the blocks of data 115 are captured by the differencing disk 146. Thus, when the destination virtual machine 144b experiences a fault or other suitable types of failure, the destination node 106b (e.g., via a hypervisor) can readily recover such a fault by instantiating and starting another destination virtual machine 144b based on the complete copy of the data blocks 115 in the base caching disk 148 and the blocks of data 117 in the differencing disk 146.

Figure 3G:
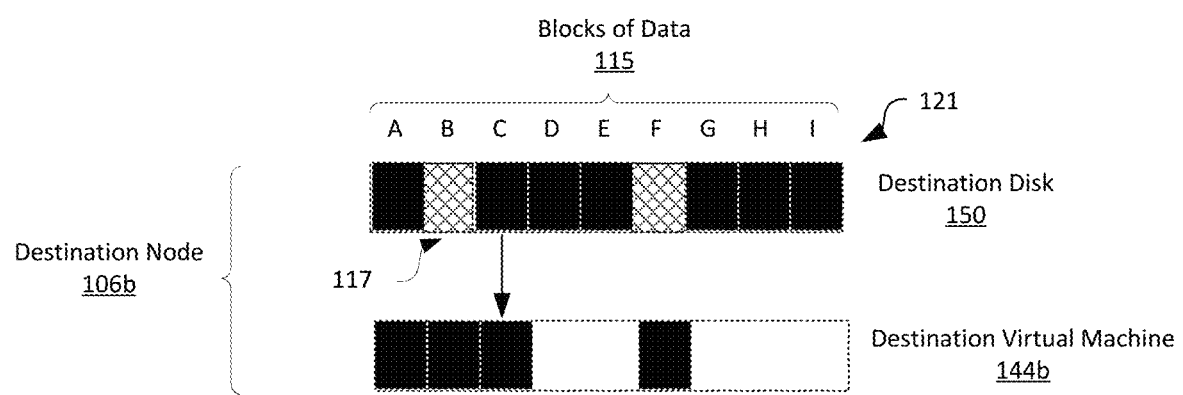

Optionally, in certain embodiments, the base caching disk 148 and the differencing disk 146 can be merged into a destination disk 150, as shown in FIG. 3G. Such merging can be based on an elapsed time or other suitable criteria. In other embodiments, the merging of the base caching disk 148 and the differencing disk 146 may be omitted.

Figure 4A:
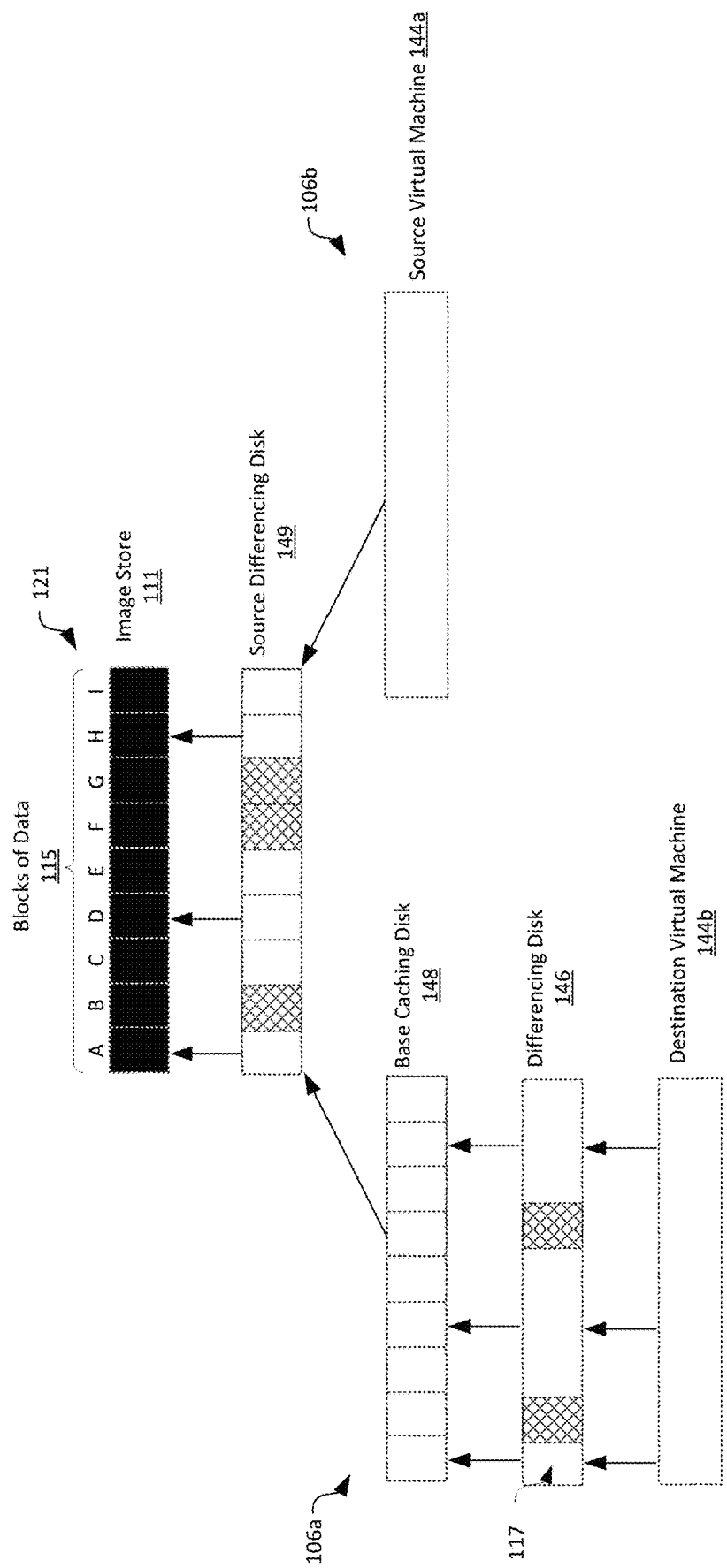
FIGS. 4A-4C are schematic diagrams illustrating additional operation stages of utilizing a base caching disk for facilitating live migration of virtual machines in accordance with embodiments of the disclosed technology.
Figure 4B:
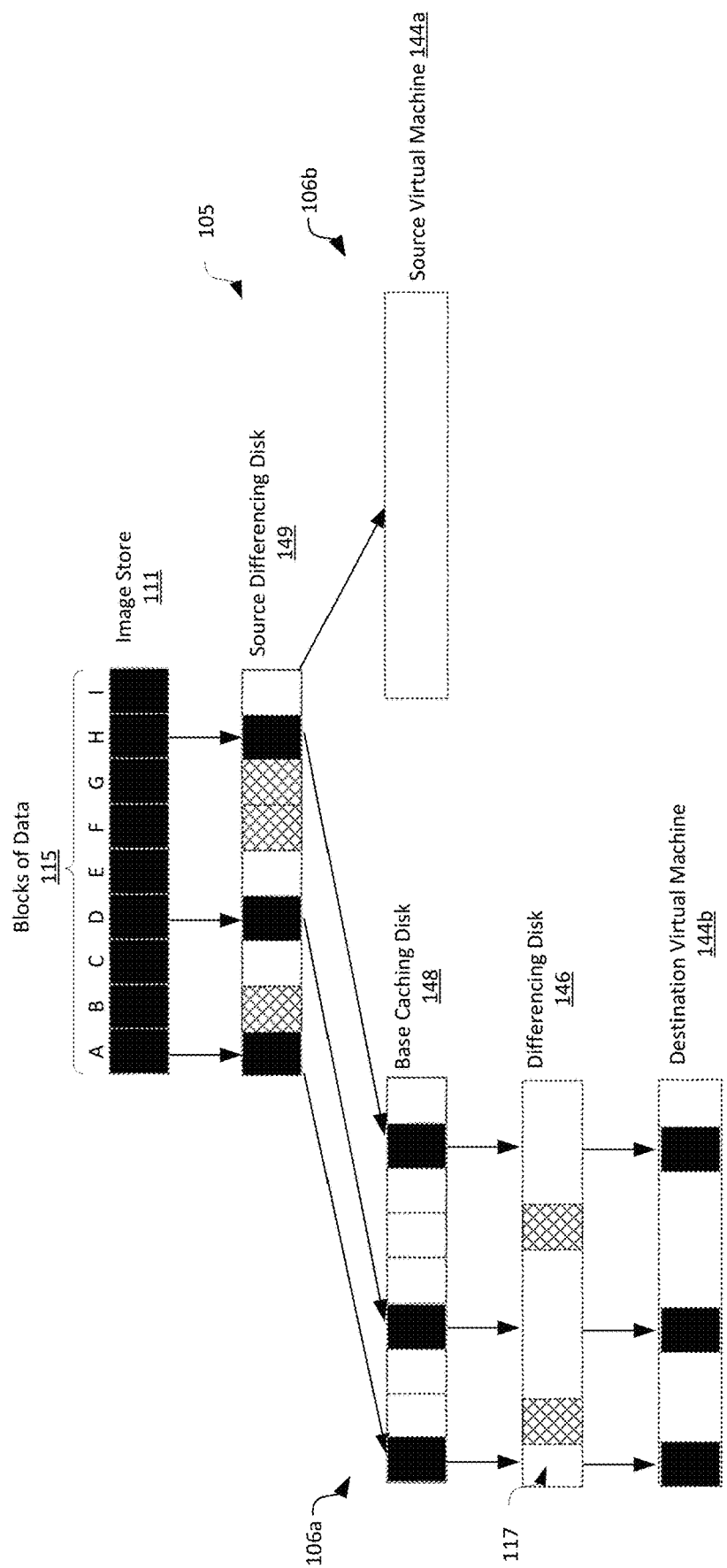
Figure 4C:
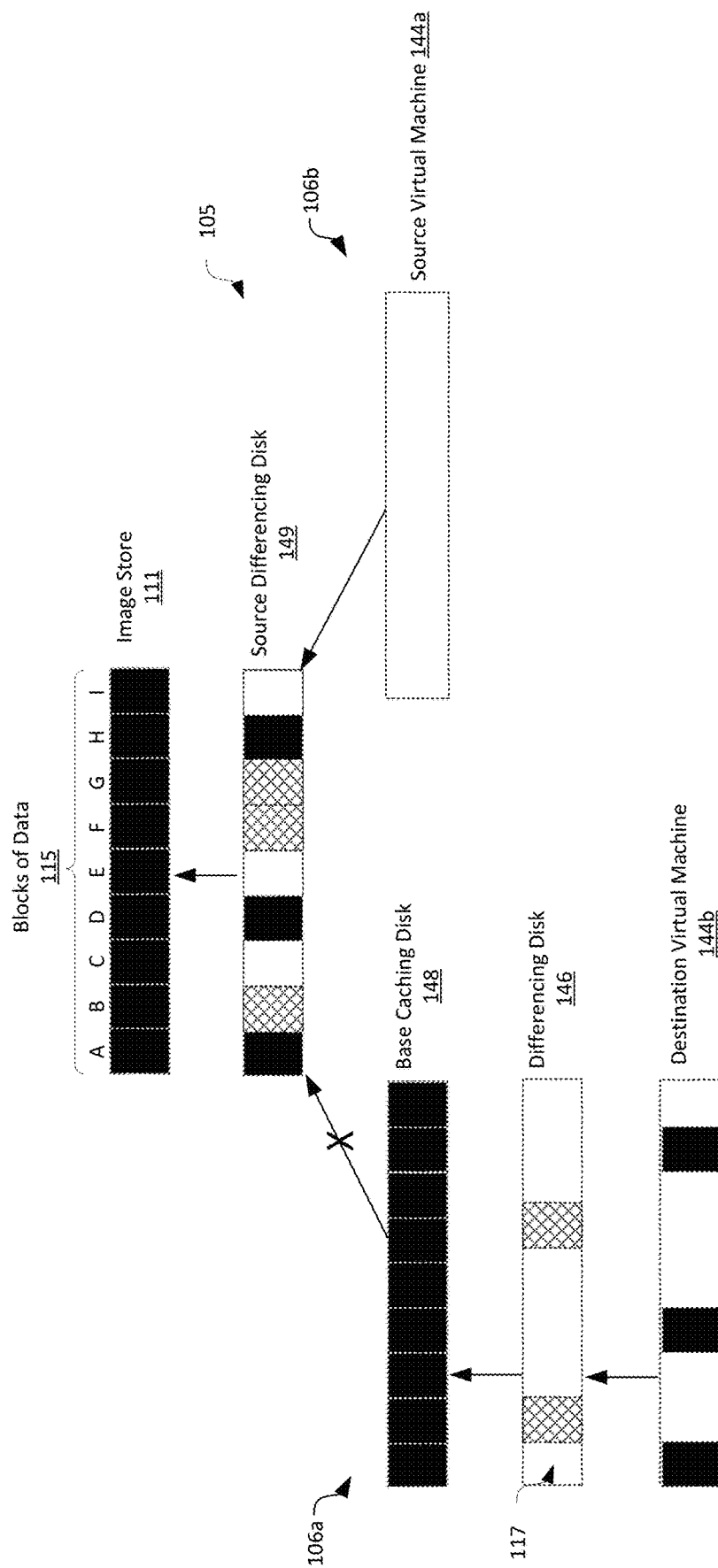

FIGS. 4A-4C are schematic diagrams illustrating various operation stages of utilizing a base caching disk 148 for facilitating live migration of virtual machines 144 in a distributed computing system 100 shown in FIG. 2B in accordance with embodiments of the disclosed technology. Even though only the source and destination nodes 106a and 106b are shown in FIGS. 4A-4C, in other embodiments, similar operations can be implemented for any suitable number of nodes 106 (FIG. 1).

As shown in FIG. 4A, the destination virtual machine 144b on the destination node 106b can request certain blocks of data 115 during an initial stage of the live migration process. For example, as shown in FIG. 4A, the destination virtual machine 144b requests blocks A, E, and I for illustration purposes. Similar to the operations in FIGS. 3A and 3B, in response to determining that the differencing disk 146 does not contain the requested data, the control component (FIG. 2B) can determine whether the base caching disks 148 at the destination node 106b contain such data.

In response to determining that the base caching disk 148b does not contain such data, in certain embodiments, the control component 135 can determine whether the source differencing disk 149, which is a parent to the base caching disk 148, contains such data. In response to determine that the source differencing disk 149 does contain such data, for example, data block B, the control component 135 can retrieve a copy of the needed data from the source differencing disk 149 and store the retrieved data in the base caching disk 148. In response to determine that the source differencing disk 149 also does not contain such data, the control component 135 can request a copy of the needed data from the blocks of data 115 in the image store 111.

As shown in FIG. 4B, the image store 111 can provide the request copy of blocks of data 115 to the base caching disk 148 to be stored in corresponding sectors. The written to sectors are then marked as read-only. The base caching disk 148 can then make available a copy of the requested blocks of data 115 to the destination virtual machine 144b. For instance, as shown in FIG. 4B, the base caching disk 148 can retrieve or pull blocks A, D, and H from the image store 111. The base caching disk 148 can the store the received blocks of data 115 in corresponding sectors and mark these sectors as read-only before providing the data to the destination virtual machine 144b for processing.

As shown in FIG. 4C, as more blocks of data 115 are requested from the source differencing disk 149 and/or the image store 111, or via background processing, the base caching disk 148 can eventually contain an entire copy of the blocks of data 115 and/or the blocks of data 117 in the source differencing disk 149. Upon determining that the base caching disk 148 contains a complete copy of the blocks of data 115, the source differencing disk 149 can be removed as a parent from the base caching disk 148. Subsequent data requests from the destination virtual machine 144b can be served from the base caching disk 148 and/or the differencing disk 146 without accessing the source differencing disk 149 or the image store 111.

Figure 5:
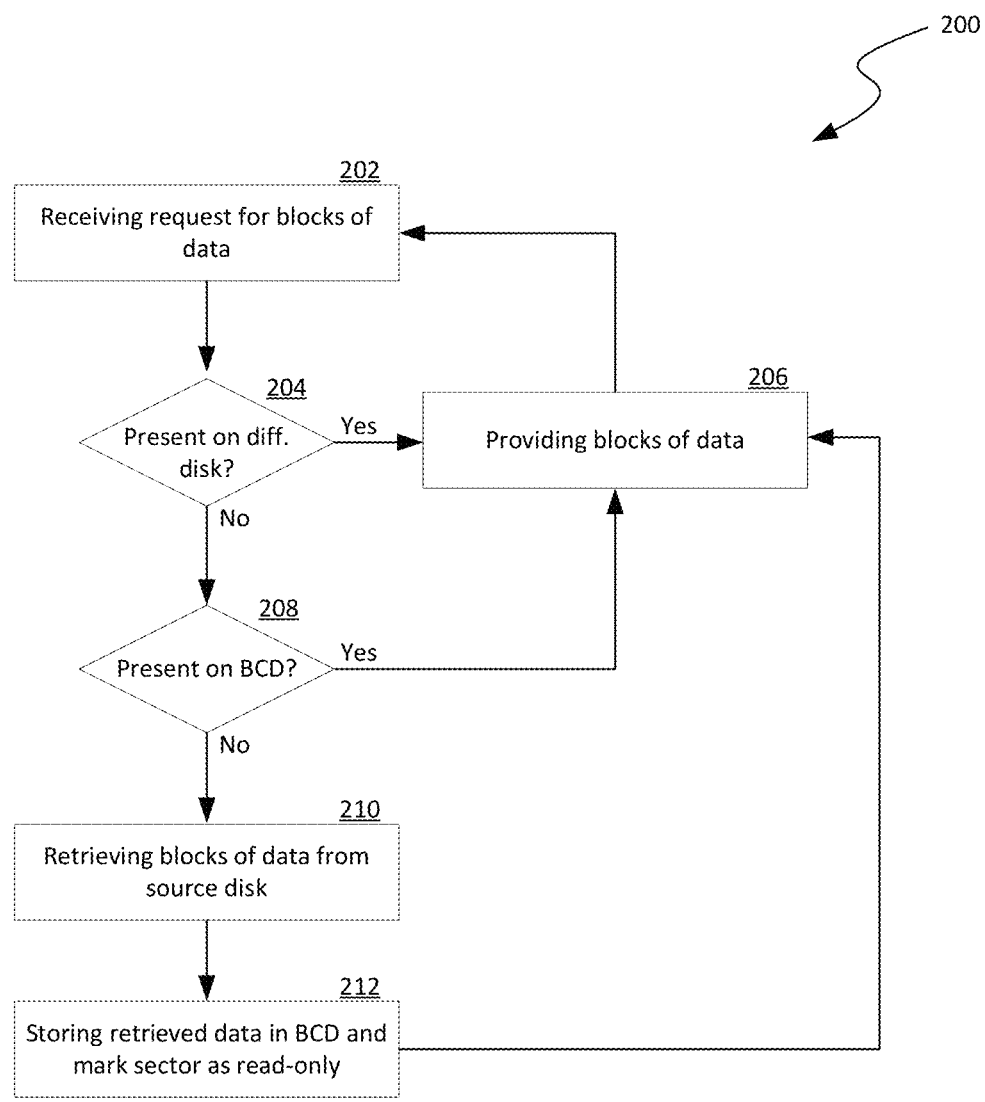
FIGS. 5 and 6 are flowcharts illustrating processes related to efficient live migration of virtual machines in a distributed computing system in accordance with embodiments of the disclosed technology.
Figure 6:
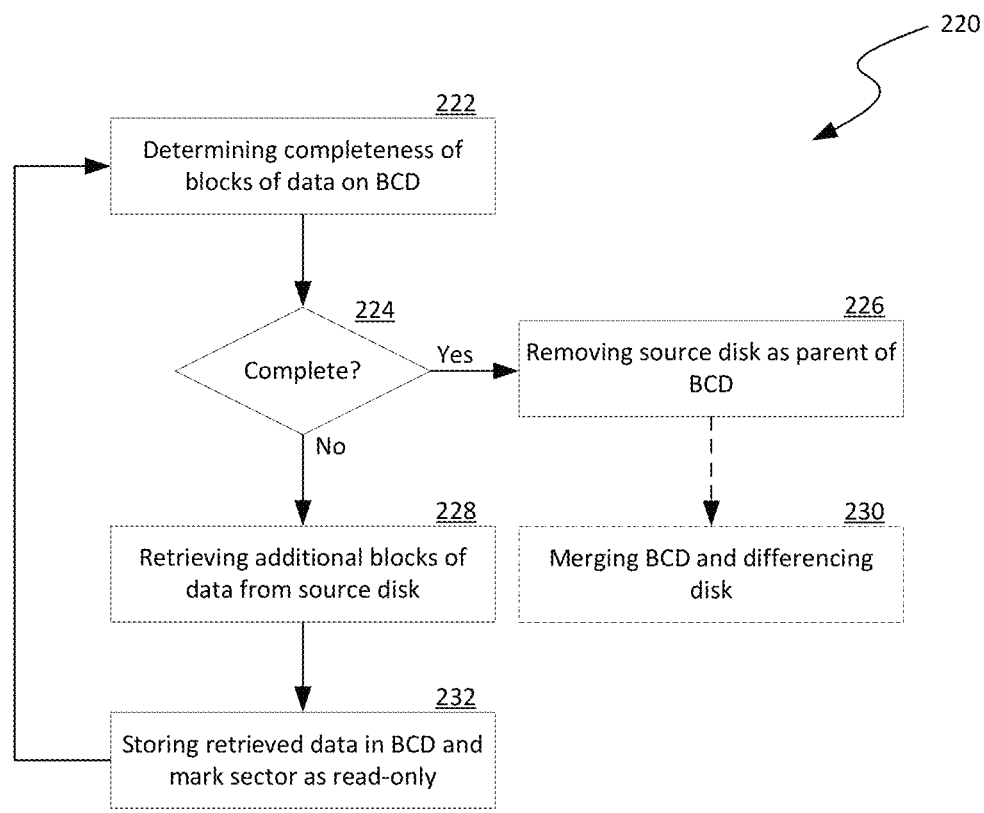

FIGS. 5 and 6 are flowcharts illustrating processes related to live migration of virtual machines in a distributed computing system in accordance with embodiments of the disclosed technology. Though the processes illustrated in FIGS. 5 and 6 are described in relation to the distributed computing system 100 of FIGS. 1-4C, in other embodiments, the processes can also be implemented in computing systems with additional and/or different components.

As shown in FIG. 5, a process 200 for live migration of a virtual machine can include receiving a request for one or more blocks of data of a source virtual machine to be migrated from a source node to a destination node as a destination virtual machine, at stage 202. The process 200 can then include a decision stage 204 to determine whether the requested blocks of data are present on a differencing disk associated with the destination virtual machine. Such determination can be based on file mapping or other suitable meta data of the differencing disk. In response to determining that the differencing disk contains the block of data, the process 200 can include providing the blocks of data from the differencing disk to the destination virtual machine.

In response to determining that the differencing disk does not contain the blocks of data, the process 200 can include another decision stage 208 to determine whether a base caching disk that is a parent to the differencing disk contains such blocks of data. In response to determining that the base caching disk contains the blocks of data, the process 200 can include providing the blocks of data from the base caching disk at stage 206. In response to determining that the base caching disk does not contain the block of data, the process 200 can retrieving the blocks of data from a source disk containing a copy of the requested blocks of data of the source virtual machine on the source node at stage 210. Such retrieval can include querying a database, requesting copies of data blocks, receiving requested data blocks, and/or other suitable operations. The process 200 can then include storing the received blocks of data in the base caching disk in corresponding sectors and marking such sectors as read-only thereafter at stage 212 before reverting to providing the block of data at stage 206.

FIG. 6 illustrates a process 220 of managing a base caching disk such as that shown in FIGS. 3A-3G. For example, as shown in FIG. 6, the process 220 can include determining a completeness of a copy of blocks of data of a source virtual machine on a base caching disk at stage 222. The base caching disk is a child of a source disk utilized by the source virtual machine to be live migrated from a source node to a destination node as a destination virtual machine corresponding to the base caching disk. The process 220 can then include a decision stage to determine whether a copy of the blocks of data on the base caching disk is complete. In response to determining that the copy of the blocks of data is complete on the base caching disk, the process 220 can include removing the source disk of the source virtual machine as a parent to the base caching disk at stage 226. Optionally, the process 220 can also include merging the base caching disk with a differencing disk associated with the destination virtual machine at stage 230. Otherwise, the process 220 can include retrieving additional blocks of data either on-demand or via background processing from the source disk at stage 228. The process 220 can then include storing the received blocks of data in the base caching disk in corresponding sectors and marking such sectors as read-only thereafter at stage 232 before reverting to determining a completeness of the blocks of data on the base caching disk at stage 222.

Figure 7:
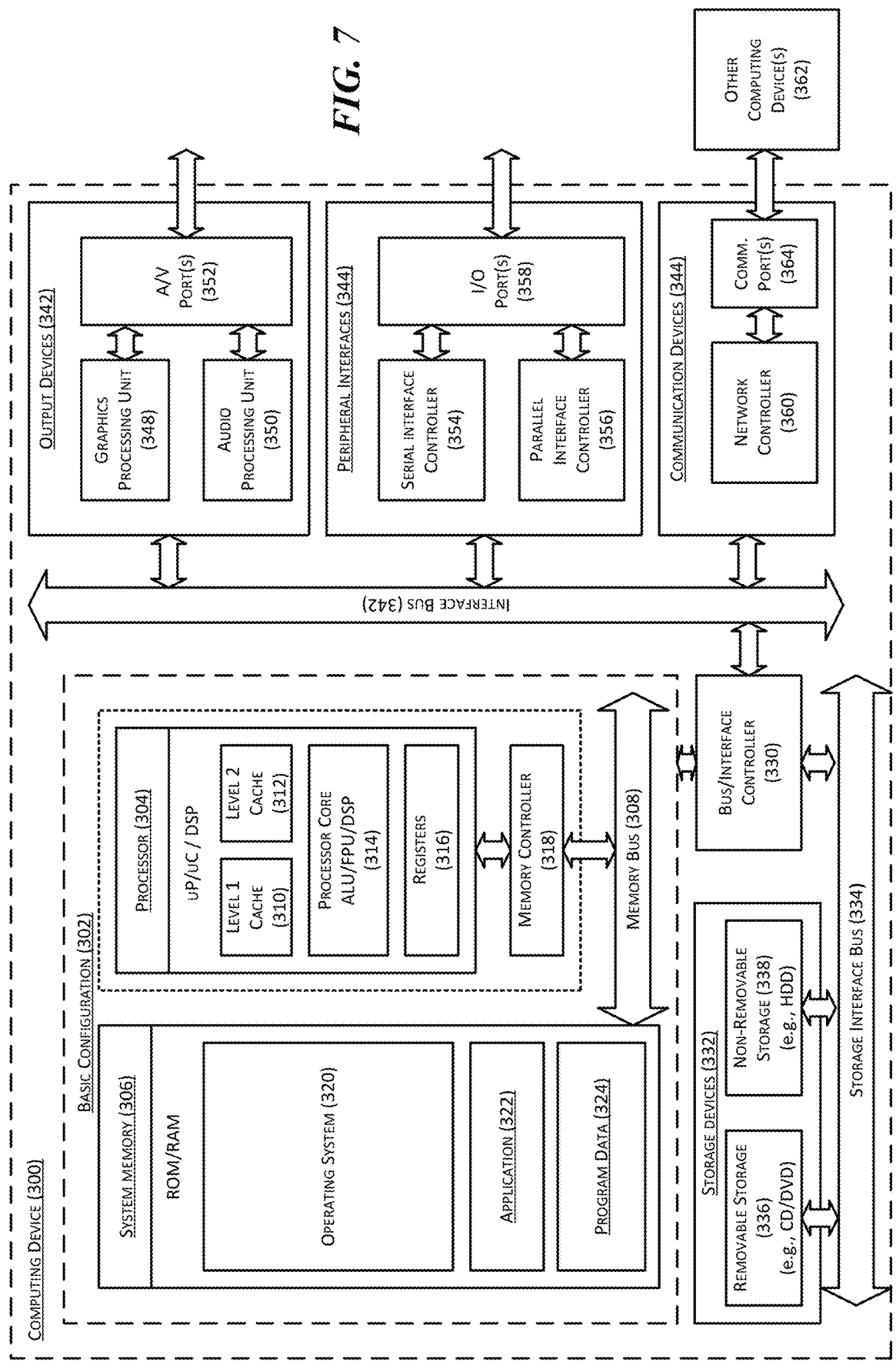
FIG. 7 is a computing device suitable for certain components of the distributed computing system in FIG. 1.

FIG. 7 is a computing device 300 suitable for certain components of the distributed computing system 100 in FIG. 1. For example, the computing device 300 can be suitable for the nodes 106 of FIG. 1 or the provisioning controller 109 of FIGS. 2A and 2B. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 4 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated or other types of signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of live migration of virtual machines on nodes interconnected via a computer network in a distributed computing system, the method comprising:
   suspending a source virtual machine on a first node, upon being suspended, the source virtual machine having blocks of data contained in a source virtual disk;
   instantiating and starting a destination virtual machine on a second node, wherein the destination virtual machine includes a destination virtual disk as a parent and a differencing disk as a child of the destination virtual disk;
   receiving, at the second node, a request from the started destination virtual machine for one of the blocks of data of the suspended source virtual machine; and
   in response to receiving the request from the started destination virtual machine,
      determining whether the requested block of data is available at the differencing disk;
      in response to determining that the requested block of data is not available at the differencing disk, determining whether the destination virtual disk on the second node contains the requested block of data; and
      in response to determining that the destination virtual disk does not contain the requested block of data,
         retrieving, via the computer network, the requested block of data from the source virtual disk, the source virtual disk is a parent to the destination virtual disk of the started destination virtual machine;
         writing the retrieved block of data to one or more empty sectors of the destination virtual disk;
         upon completion of writing the retrieved block of data, marking the one or more sectors containing the written block of data as read-only on the destination virtual disk; and
         providing a copy of the retrieved block of data from the destination virtual disk to the destination virtual machine, thereby enabling operation of the destination virtual machine without waiting for retrieving other blocks of data of the source virtual machine.

2. The method of claim 1 wherein the method further includes:
   in response to receiving the request for the block of data, determining whether the requested block of data is available at the differencing disk; and
   in response to determining that the requested block of data is available at the differencing disk, providing the block of data from the differencing disk in response to the received request.

3. The method of claim 1 wherein the method further includes:
   in response to receiving the request for the block of data, determining whether the requested block of data is available at the differencing disk;
   in response to determining that the requested block of data is not available at the differencing disk, determining whether the destination virtual disk on the second node contains the requested block of data; and
   in response to determining that the destination virtual disk contains the requested block of data, providing the block of data from the destination virtual disk in response to the received request without retrieving the block of data from the source virtual disk of the first node.

4. The method of claim 1 wherein the destination virtual disk is a child of the source virtual disk, and wherein the method further includes:
   repeating retrieving, writing, and marking operations for additional blocks of data via background processing on the second node;
   determining whether the destination virtual disk contains a complete copy of the blocks of data corresponding to the source virtual machine; and
   in response to determining that the destination virtual disk contains a complete copy of the blocks of data corresponding to the source virtual machine, removing the source virtual disk on the first node as a parent to the destination virtual disk on the second node.

5. The method of claim 1 wherein the destination virtual disk is a child of the source virtual disk, and wherein the method further includes:
   determining whether the destination virtual disk contains a complete copy of the blocks of data corresponding to the source virtual machine;
   in response to determining that the destination virtual disk contains a complete copy of the blocks of data corresponding to the source virtual machine, removing the source virtual disk on the first node as a parent to the destination virtual disk on the second node; and
   providing the blocks of data from the destination virtual disk in response to additional requests for blocks of data.

6. The method of claim 1 the destination virtual disk is a child of the source virtual disk, and wherein the method further includes:
   determining whether the destination virtual disk contains a complete copy of the blocks of data corresponding to the source virtual machine; and
   in response to determining that the destination virtual disk contains a complete copy of the blocks of data corresponding to the source virtual machine,
      removing the source virtual disk on the first node as a parent to the destination virtual disk on the second node; and
      merging the blocks of data contained in the destination virtual disk and data contained in the differencing disk into a destination virtual disk.

7. The method of claim 1 retrieving the requested block of data includes:
   determining whether the source differencing disk contains the requested block of data; and
   in response to determining that the source differencing disk contains the requested block of data, providing the requested block of data from the source differencing disk to the destination virtual disk via the computer network.

8. The method of claim 1 retrieving the requested block of data includes:
   determining whether the source differencing disk contains the requested block of data; and
   in response to determining that the source differencing disk does not contain the requested block of data,
      retrieving the requested block of data from the image store; and
      providing the retrieved block of data from the image store via the source differencing disk to the destination virtual disk.

9. A computing device interconnected with additional computing devices in a distributed computing system via a computer network, the computing device comprising:
   a processor; and
   a memory containing instructions executable by the processor to cause the computing device to:
      instantiate and start a destination virtual machine on the computing device for live migration of a source virtual machine from another computing device, the computing device having a destination virtual disk that is a child of a source virtual disk containing blocks of data of the source virtual machine upon suspension and a differencing disk as a child of the destination virtual disk;
      receive a request from the destination virtual machine for a block of data of the source virtual machine; and
      in response to receiving the request for the block of data,
         determine whether the requested block of data is available at the differencing disk; and
         in response to determining that the requested block of data is not available at the differencing disk, determining whether the destination virtual disk contains the requested block of data; and
         in response to determining that the destination virtual disk does not contain the requested block of data,
            retrieve, via the computer network, the requested block of data from the source virtual disk;
            write the retrieved block of data to one or more empty sectors of the destination virtual disk;
            upon completion of writing the retrieved block of data, mark the one or more sectors containing the written block of data as read-only; and
            provide a copy of the retrieved block of data from the destination virtual disk to the destination virtual machine.

10. The computing device of claim 9 wherein the memory contains additional instructions executable by the processor to cause the computing device to:
    in response to receiving the request for the block of data, determine whether the requested block of data is available at the differencing disk; and
    in response to determining that the requested block of data is available at the differencing disk, provide the block of data from the differencing disk in response to the received request.

11. The computing device of claim 9 the memory contains additional instructions executable by the processor to cause the computing device to:
    in response to receiving the request for the block of data, determine whether the requested block of data is available at the differencing disk;
    in response to determining that the requested block of data is not available at the differencing disk, determine whether the destination virtual disk contains the requested block of data; and
    in response to determining that the destination virtual disk contains the requested block of data, provide the block of data from the destination virtual disk in response to the received request without retrieving the block of data from the source virtual disk.

12. The computing device of claim 9 the memory contains additional instructions executable by the processor to cause the computing device to:
    repeat retrieving, writing, and marking operations for additional blocks of data via background processing;
    determine whether the destination virtual disk contains a complete copy of the blocks of data corresponding to the source virtual machine; and
    in response to determining that the destination virtual disk contains a complete copy of the blocks of data corresponding to the source virtual machine, remove the source virtual disk on the first node as a parent to the destination virtual disk on the second node.

13. The computing device of claim 9 the memory contains additional instructions executable by the processor to cause the computing device to:
    determine whether the destination virtual disk contains a complete copy of the blocks of data corresponding to the source virtual machine; and
    in response to determining that the destination virtual disk contains a complete copy of the blocks of data corresponding to the source virtual machine,
       remove the source virtual disk as a parent to the destination virtual disk; and
       merge the blocks of data contained in the destination virtual disk and data contained in the differencing disk into a destination virtual disk.

14. A method of live migration of virtual machines on nodes interconnected via a computer network in a distributed computing system, the method comprising:
    during a post-copy live migration of a source virtual machine on a first node to a destination virtual machine on a second node,
       receiving, at the second node, a request from the destination virtual machine for one of the blocks of data of the suspended source virtual machine, wherein the destination virtual machine includes a destination virtual disk as a parent and a differencing disk as a child of the destination virtual disk; and
       in response to receiving the request from the destination virtual machine,
          determining whether the requested one of the blocks of data is available at the differencing disk;
          in response to determining that the requested block of data is not available at the differencing disk, determining whether the destination virtual disk on the second node contains the requested one of the requested blocks of data of the source virtual machine upon suspension of the source virtual machine on the first node, sectors of the destination virtual disk being writable only once and read-only thereafter; and
          in response to determining that the destination virtual disk does not contain the requested one of the blocks of data,
             retrieving, via the computer network, a copy of the block of data from the source virtual disk at the first node via the computer network;

writing the retrieved block of data to one or more sectors on the destination virtual disk at the second node; and marking the one or more sectors containing the written block of data on the destination virtual disk as read-only.

15. The method of claim 14, further comprising:

obtaining a copy of the block of data from the one or more read-only sectors of the destination virtual disk; and providing the obtained copy of the block of data from the destination virtual disk to the destination virtual machine to continue the live migration.

16. The method of claim 14 wherein the destination virtual machine includes a differencing disk as a child of the destination virtual disk, and wherein the method further includes:

determining whether the destination virtual disk contains a complete copy of the blocks of data corresponding to the source virtual machine; and in response to determining that the destination virtual disk contains a complete copy of the blocks of data corresponding to the source virtual machine, removing the source virtual disk on the first node as a parent to the destination virtual disk on the second node.

17. The method of claim 14 wherein the destination virtual machine includes a differencing disk as a child of the destination virtual disk, and wherein the method further includes:

determining whether the destination virtual disk contains a complete copy of the blocks of data corresponding to the source virtual machine; and in response to determining that the destination virtual disk contains a complete copy of the blocks of data corresponding to the source virtual machine, removing the source virtual disk on the first node as a parent to the destination virtual disk on the second node; and upon detecting a failure of the destination virtual machine, instantiating and starting another destination virtual machine on the second node utilizing the complete copy of the blocks of data in the destination virtual disk and data contained in the differencing disk.

18. The method of claim 14 wherein the destination virtual machine includes a differencing disk as a child of the destination virtual disk, and wherein the method further includes:

determining whether the destination virtual disk contains a complete copy of the blocks of data corresponding to the source virtual machine; and in response to determining that the destination virtual disk contains a complete copy of the blocks of data corresponding to the source virtual machine, merging the blocks of data contained in the destination virtual disk and data contained in the differencing disk into a destination virtual disk.

\* \* \* \* \*